United States Patent
Cideciyan et al.

(10) Patent No.: US 8,645,800 B2
(45) Date of Patent: *Feb. 4, 2014

(54) INTEGRATED DATA AND HEADER PROTECTION FOR TAPE DRIVES

(75) Inventors: Roy Daron Cideciyan, Rueschlikon (CH); Hisato Matsuo, Yokohama (JP); Thomas Mittelholzer, Zurich (CH); Kenji Ohtani, Fujisawa (JP); Paul J Seger, Tucson, AZ (US); Keisuke Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/451,233

(22) Filed: Apr. 19, 2012

(65) Prior Publication Data

US 2012/0210194 A1    Aug. 16, 2012

Related U.S. Application Data

(63) Continuation of application No. 12/757,882, filed on Apr. 9, 2010.

(51) Int. Cl.
  *G06F 11/00* (2006.01)
(52) U.S. Cl.
  USPC .............. 714/771; 714/52; 714/756; 714/784
(58) Field of Classification Search
  USPC ........................................................ 714/771
  See application file for complete search history.

(56) References Cited

U.S. PATENT DOCUMENTS

| | | | |
|---|---|---|---|
| 5,369,532 A | 11/1994 | Dodt et al. | |
| 5,369,641 A | 11/1994 | Dodt et al. | |
| 5,576,903 A | 11/1996 | Brown et al. | |
| 6,718,510 B2 * | 4/2004 | Kojima | 714/784 |
| 7,076,660 B2 | 7/2006 | Newman | |
| 7,376,888 B2 * | 5/2008 | Jaquette et al. | 714/771 |
| 7,475,324 B2 * | 1/2009 | Nagai | 714/763 |
| 2004/0261001 A1 | 12/2004 | Chang et al. | |
| 2005/0229085 A1 | 10/2005 | Van Dijk et al. | |

(Continued)

FOREIGN PATENT DOCUMENTS

| EP | 0297809 B1 | 11/1992 |
|---|---|---|
| EP | 2234305 A1 | 9/2010 |

(Continued)

OTHER PUBLICATIONS

Standard ECMA-319, Standardizing Information and Communication Systems, Data Interchange on 12,7 mm 384-Track Magnetic Tape Cartridges — Ultrium-1 Format, Jun. 2001, http://www.ecma.ch.

(Continued)

*Primary Examiner* — Christopher McCarthy
(74) *Attorney, Agent, or Firm* — Nelson and Nelson; Daniel P. Nelson; Alexis V. Nelson

(57) ABSTRACT

A method for integrating data and header protection in tape drives includes receiving an array of data organized into rows and columns. The array is extended to include one or more headers for each row of data in the array. The method provides two dimensions of error correction code (ECC) protection for the data in the array and a single dimension of ECC protection for the headers in the array. A corresponding apparatus is also disclosed herein.

13 Claims, 8 Drawing Sheets

(56) References Cited

U.S. PATENT DOCUMENTS

| | | |
|---|---|---|
| 2008/0184089 A1 | 7/2008 | Cideciyan et al. |
| 2009/0037793 A1* | 2/2009 | Chuang et al. ............... 714/769 |
| 2010/0180180 A1* | 7/2010 | Cideciyan et al. ............ 714/771 |

FOREIGN PATENT DOCUMENTS

| | | |
|---|---|---|
| JP | 55122213 A | 9/1980 |
| JP | 63046660 A | 2/1988 |
| JP | 2000353361 A | 12/2000 |
| JP | 2008186572 A | 8/2008 |

OTHER PUBLICATIONS

Jaquette, G. A., "LTO; A Better Format for Mid-Range Tape," IBM Journal of Research and Development, pp. 429-444, Jul. 2003.

PCT International Search Report and Written Opinion, International Application No. PCT/EP2011/055392, Oct. 19, 2011.

* cited by examiner

INTEGRATED DATA AND HEADER PROTECTION FOR TAPE DRIVES

BACKGROUND

1. Field of the Invention

This invention relates to tape drives, and more particularly to apparatus and methods for integrating data and header protection in tape drives

2. Background of the Invention

In some tape drives, such as current LTO and enterprise-level tape drives, variable-length blocks of data are received from a host interface and converted into fixed units known as data sets. These data sets are typically broken down into smaller fixed units known as sub data sets (SDSs). Error correction coding is then performed on these sub data sets as a unit to protect the data contained therein.

To protect data in an SDS, conventional tape drives may organize a sub data set into a two-dimensional array made up of rows and columns. Each row in the two-dimensional array may be made up of multiple (e.g., 2 or 4) interleaved data words. Error correction codes may then be generated for each row in the array and each column in the array to protect the data contained therein. This in essence provides two dimensions of protection for data in the array since protection is provided for both the rows and columns. Once generated, the error correction codes may be appended to the array for eventual storage on the magnetic tape medium.

Once error correction codes are appended to the array, one or more headers may be generated and appended to each row in the array. These headers generally store addressing information and other meta data associated with the data words in the array. These headers are typically not protected by error correction codes although they may contain error detection codes such as cyclic redundancy checks (CRCs). Generating and storing error correction codes in the headers may increase the size of the headers and undesirably reduce the efficiency of the storage format.

As the linear recording density for tape storage media continues to increase, error rates for the data and headers stored on the tape are also expected to increase. Errors in the data may be corrected using the error correction codes appended to the array. However, errors in the headers may be more problematic since they may not be protected by error correction codes. If a header is corrupt and cannot be recovered, all or part of the data that is referenced by the header may be lost. Conventional techniques for determining and correcting header errors using along-track and across-track interpolation are not sufficient to protect tape headers at high linear densities and track densities. Furthermore, formats that permit along-track and across-track interpolation are limited in flexibility to rewrite data that is detected in error during the read-while-write operation.

In view of the foregoing, what are needed are apparatus and methods to more effectively protect headers in current or future tape storage formats. More specifically, apparatus and methods are needed to generate error correction codes for data and headers that will provide sufficient protection for both while not incurring restrictions on rewrite flexibility. Such apparatus and methods will ideally provide such protection while preserving storage format efficiency.

SUMMARY

The invention has been developed in response to the present state of the art and, in particular, in response to the problems and needs in the art that have not yet been fully solved by currently available apparatus and methods. Accordingly, the invention has been developed to provide apparatus and methods to integrate data and header protection in tape drives. The features and advantages of the invention will become more fully apparent from the following description and appended claims, or may be learned by practice of the invention as set forth hereinafter.

Consistent with the foregoing, a method for integrating data and header protection in tape drives is disclosed herein. In one embodiment, such a method includes providing a data array organized into rows and columns. The method then generates column ECC parity for the columns and appends the column ECC parity to the data array. The method then adds one or more headers to each row of the column-extended data array. The method then generates row ECC parity for the combined rows and headers and extends the data array to include the row ECC parity. A corresponding apparatus is also disclosed herein.

In another embodiment of the invention, a method for integrating data and header protection in tape drives includes receiving an array of data organized into rows and columns. The array is extended to include one or more headers for each row of data in the array. The method provides two dimensions of error correction code (ECC) protection for the data in the array and a single dimension of ECC protection for the headers in the array. A corresponding apparatus is also disclosed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
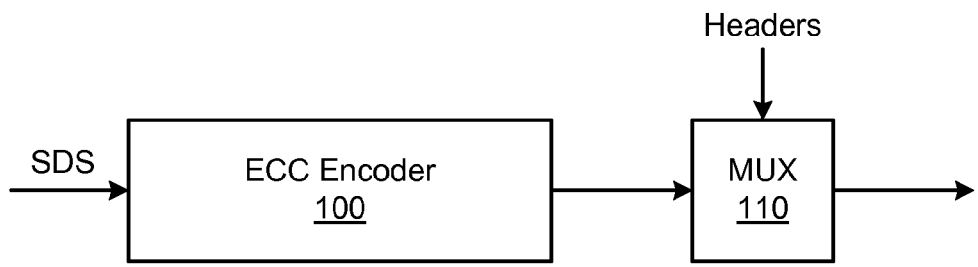
FIG. 1A is a high-level block diagram showing one prior art method for generating ECC parity to protect a data array derived from a sub data set.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining both software and hardware elements. Each of these embodiments may be represented by one or more modules or blocks. Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1B:
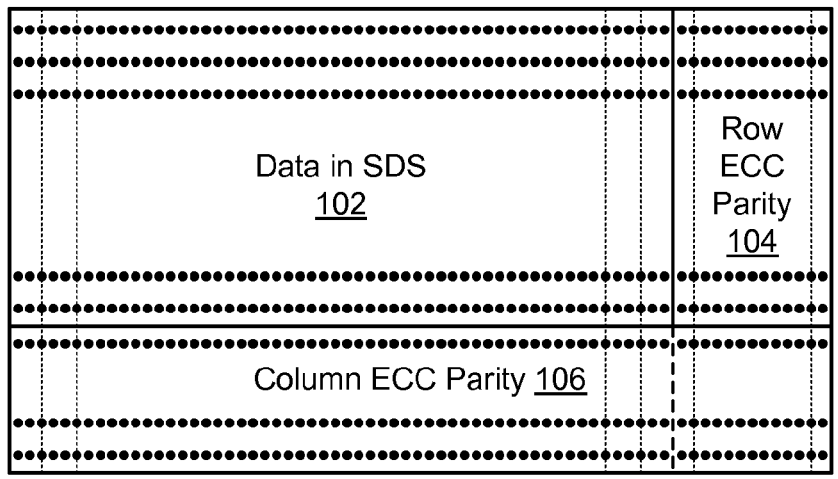
FIGS. 1B and 1C show how ECC parity information is generated and appended to a data array using the method of FIG. 1A.
Figure 1C:
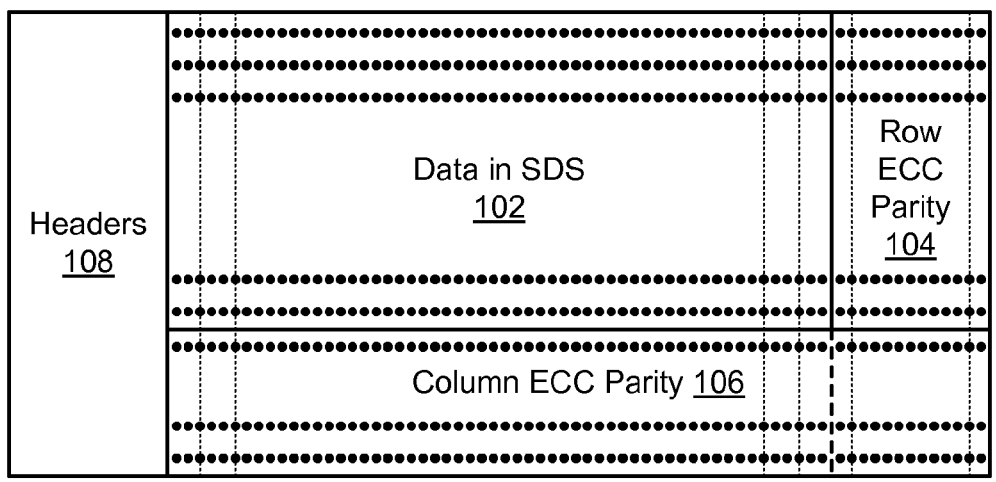

Referring to FIG. 1A, one prior art method for generating ECC parity for a data array, or sub data set (SDS), is illustrated. FIGS. 1B and 1C show how ECC parity information is generated and appended to the data array using the method of FIG. 1A. As shown in FIG. 1A, an ECC encoder 100 operates on an SDS organized into an array 102 comprising rows and columns. To protect the data in the SDS 102, the ECC encoder 100 generates ECC parity 104 for each row in the array 102 and appends the ECC parity 104 to the array 102, as shown in FIG. 1B. Similarly, the ECC encoder 100 generates ECC parity 106 for each column in the array 102, including each column of the row ECC parity 104, and appends the ECC parity 106 to the array 102. It is well known in the art that the encoded data array is the same independent of whether the row ECC parity 104 is generated in a first step and the column ECC parity 106 in a second step or the column ECC parity 106 is generated in a first step and the row ECC parity 104 in a second step.

Once the ECC parity 104, 106 is generated and appended to the array 102, a multiplexer 110 appends one or more headers 108 to each row in the extended SDS array 102. These headers 108 contain addressing information and other meta data associated with each row in the array 102 (including the column ECC parity 106 and the row ECC parity 104). These headers 108 are typically not protected by error correction codes although they may contain error detection codes such as cyclic redundancy checks (CRCs). The error detection codes may be used to detect errors in the headers 108 but are not sufficient to correct the errors. If a header 108 is corrupted and cannot be recovered, all or part of the data 102 (including the column ECC parity 106 and the row ECC parity 104) that is referenced by the header 108 may be lost.

Figure 2:
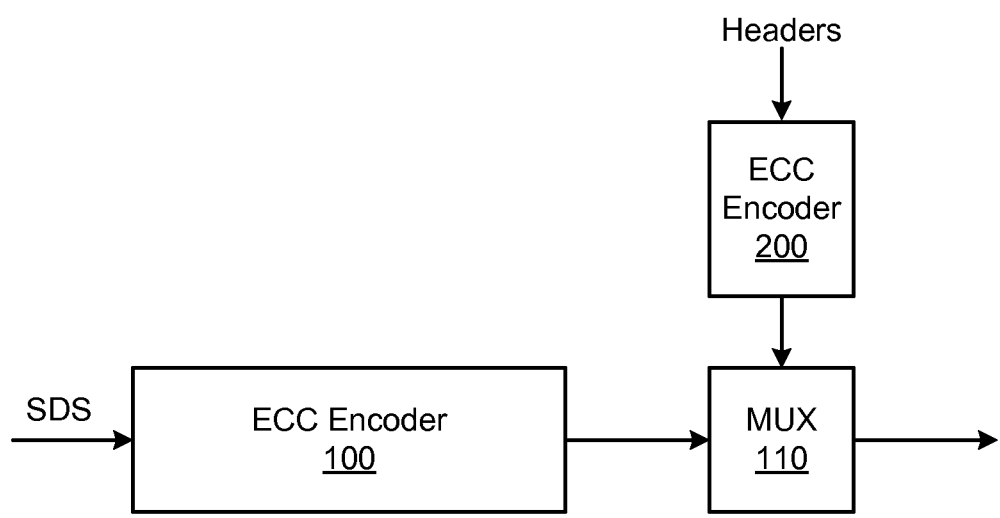
FIG. 2 is a high-level block diagram showing one prior art method for generating and storing ECC parity for headers appended to a data array.

Referring to FIG. 2, one prior art method for generating and storing ECC parity for headers 108 appended to a data array 102 (including the column ECC parity 106 and the row ECC parity 104) is illustrated. In this example, an ECC encoder 100 generates and appends ECC parity to the data array 102 as previously described. However, a separate ECC encoder 200 generates separate ECC parity for the headers 108 and appends the ECC parity to the headers 108. The headers 108 and ECC parity may then be appended to the rows in the data array 102 (including the column ECC parity 106 and the row ECC parity 104). Although effective, generating and storing error correction codes in the headers 108 may significantly increase the size of the headers 108 and undesirably reduce the efficiency of the storage format.

Figure 3:
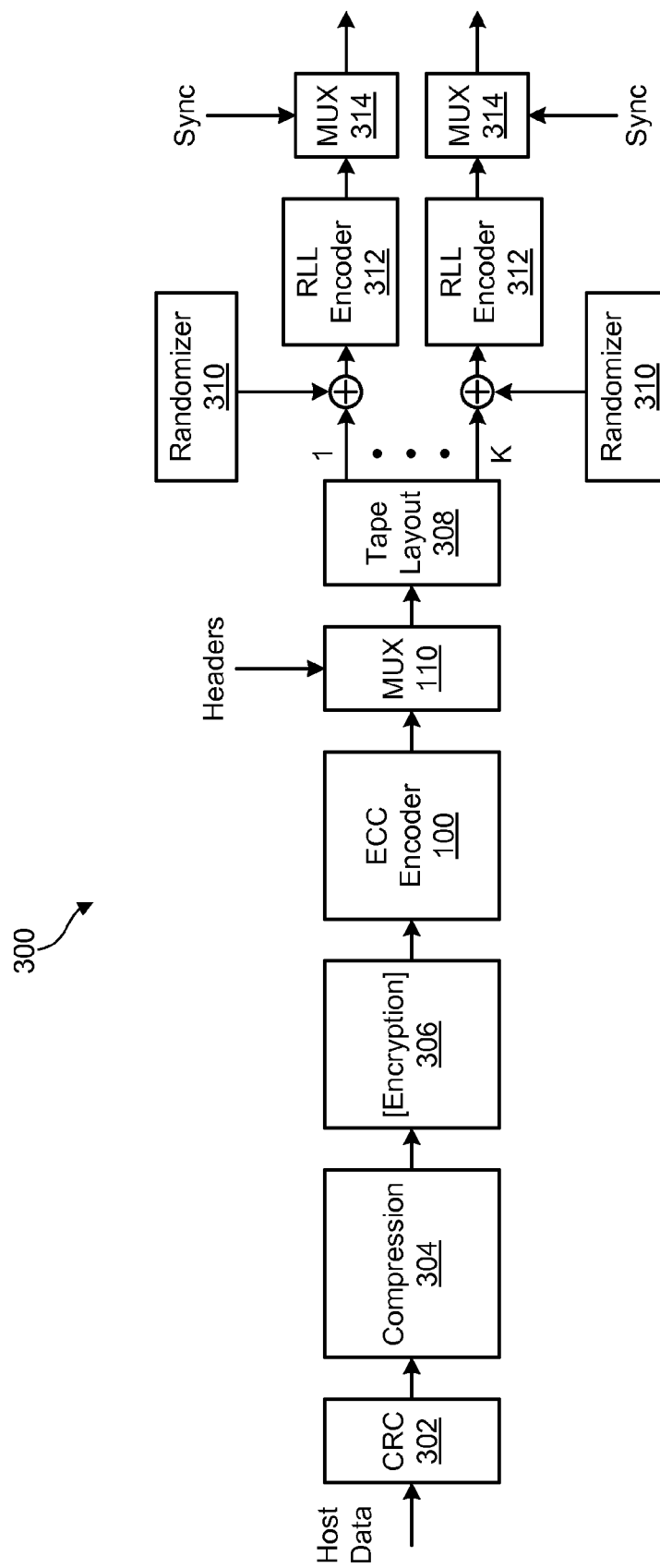
FIG. 3 is a high-level block diagram showing a data flow for various prior art tape drives.

Referring to FIG. 3, a high-level block diagram showing a data flow 300 for various prior art tape drives is illustrated. As shown, a CRC module 302 receives variable length blocks of data from a host device. The CRC module 302 may add CRC information to these blocks. A compression module 304 may then compress the blocks and an encryption module 306 may optionally encrypt the blocks. The blocks of data may then be broken into sub data sets and passed to an ECC encoder 100. The ECC encoder 100 may generate ECC parity 104, 106 for each row in the data array 102 and each column in the data array 102 and append the ECC parity 104, 106 to the array 102.

Once the ECC parity 104, 106 is appended to the array 102, a multiplexer 110 may append headers 108 to the rows in the data array 102 (including the column ECC parity 106 and the row ECC parity 104). The headers 108 may contain error detection codes such as CRCs. A tape layout module 308 may then distribute the data array 102, the ECC parity 104, 106, and the headers 108 across different tracks and in different orders on the magnetic tape. The data sequences may then be processed by randomizers 310 which perform additional signal processing on the data. Run length encoders 312 may then transform the spectra of the information so that it is better suited for magnetic recording. Multiplexers 314 may then multiplex synchronization information, such as variable frequency oscillators (VFOs), sync characters, or the like, into the information to enable it to be synchronized when read. The resulting data may then be sent to write drivers (not shown) which may cause current to flow through recording head elements to generate magnetic flux and thereby write the data to the magnetic recording medium. In general, each of the blocks or modules to the right of the multiplexer 110 perform different transformations on the data to make it more suitable for magnetic recording.

Figure 4:
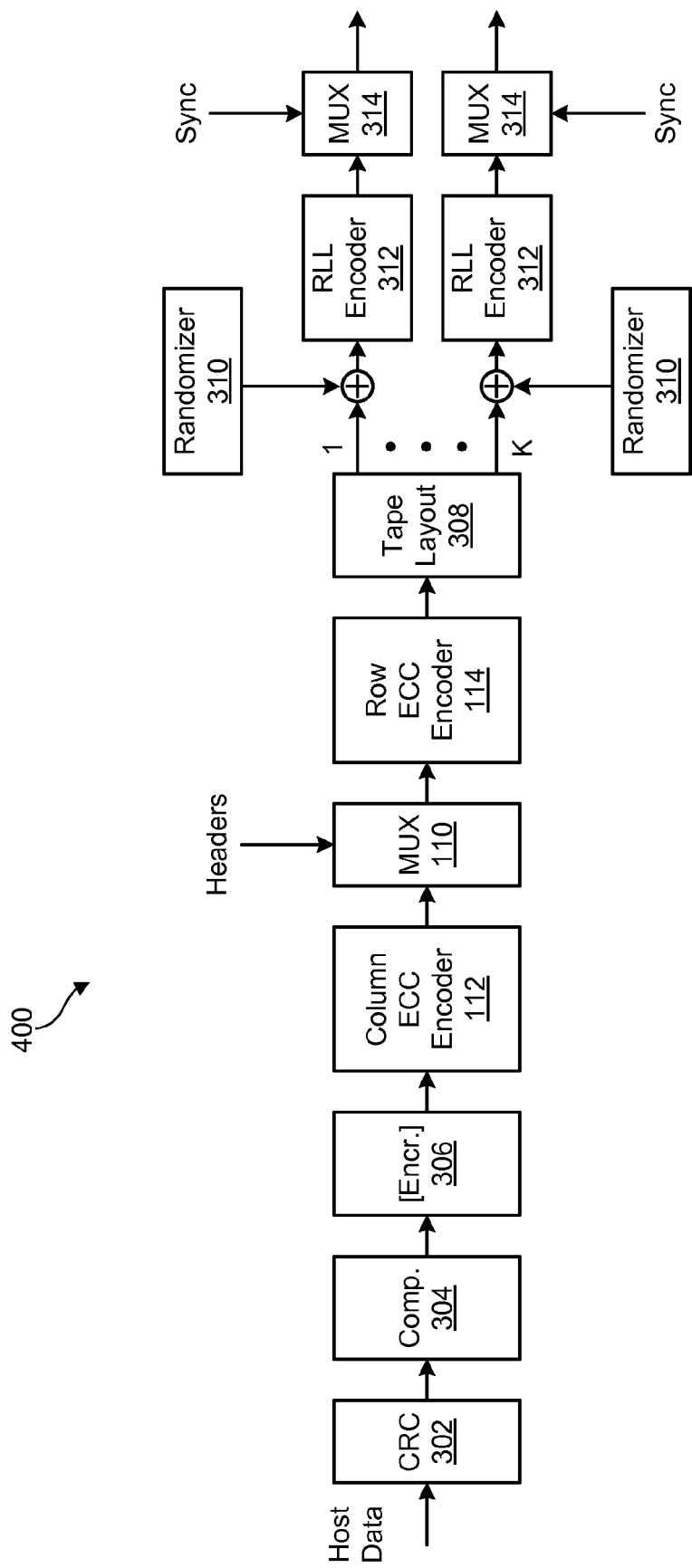
FIG. 4 is a high-level block diagram showing one embodiment of a data flow for a tape drive configured to integrate data and header protection.

Referring to FIG. 4, a high-level block diagram showing a data flow 400 that integrates data and header protection is illustrated. As shown, a CRC module 302 receives variable-length blocks from a host device and adds CRC information to these blocks. A compression module 304 may compress the blocks and an encryption module 306 may optionally encrypt the blocks. The blocks of data may then be broken into sub data sets and passed to a column ECC encoder 112. The column ECC encoder 112 may then generate ECC parity 106 for each column in the data array 102 and append the column ECC parity 106 to the array 102.

Once the column ECC parity 106 is generated and appended to the array 102, a multiplexer 110 appends headers 108 to the rows in the array 102. The extended array 102 may then be passed to a row ECC encoder 114 which generates row ECC parity for each row in the array 102. The function and benefits of the column and row ECC encoders 112, 114 will be discussed in more detail in association with FIGS. 5A and 5B. Once ECC parity information is generated for the data 102 and headers 108, a tape layout module 308, randomizers 310, run length encoders 312, and multiplexers 314 may transform the ECC-encoded data in the manner previously described to make it more suitable for magnetic recording.

Figure 5A:
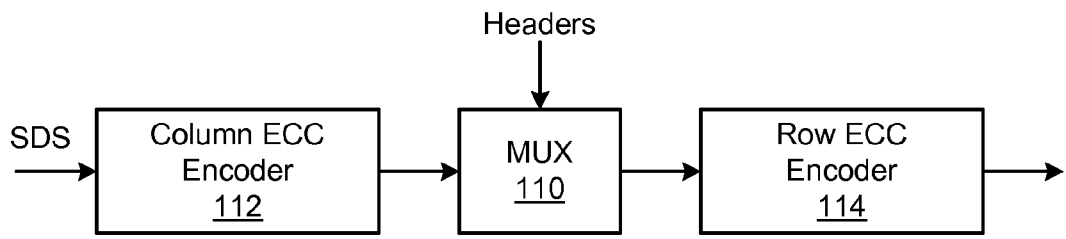
FIG. 5A is a high-level block diagram showing one embodiment of a method for generating ECC parity to protect both data and headers.
Figure 5B:
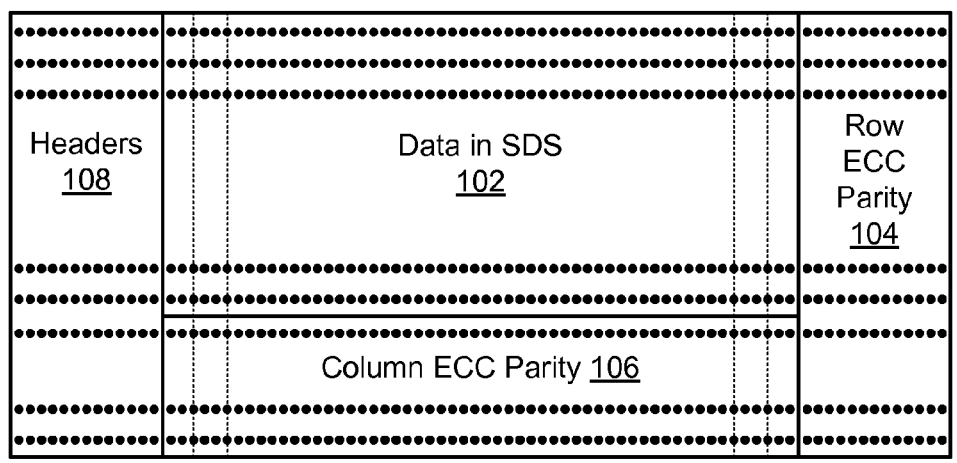
FIG. 5B shows how ECC parity information is generated and appended to a data array using the method of FIG. 5A.

Referring to FIG. 5A, one embodiment of a method for generating ECC parity to protect both the SDS data 102 and the headers 108 is illustrated. FIG. 5B shows how ECC parity information is generated and appended to an SDS data array 102 using the method of FIG. 5A. As previously discussed, upon receiving a data array 102, the column ECC encoder 112 generates ECC parity 106 for each column in the array 102 and appends the ECC parity 106 to the array 102, as shown in FIG. 5B. The multiplexer 110 then appends headers 108 to the rows in the array 102 (including the column ECC parity 106). The position of the headers 108 is arbitrary, meaning that the headers 108 may be placed at the beginning of each row, at the end of each row, be interleaved with each row, or the like.

The extended array 102 (i.e., the SDS data 102, headers 108, and column ECC parity 106) may then be passed to a row ECC encoder 114 which may generate ECC parity 104 for each row (which includes the SDS data 102, the column ECC parity 106, and the headers 108) and append the ECC parity 104 to the extended array 102. Thus, the row ECC encoder 114 generates row ECC parity 104 for the SDS data 102, the column ECC parity 106 and headers 108 combined. This in essence provides two dimensions of protection for the SDS data 102 (i.e., by providing both row and column ECC parity 104, 106) while providing a single dimension of protection for the headers 108 (by providing row ECC parity 104 only). This technique preserves format efficiency while providing sufficient ECC protection for the headers 108.

For example, assume that the SDS data 102 and headers 108 are protected in the manner described above. If the SDS data 102, row ECC parity 104, column ECC parity 106, and headers 108 are written to tape and an error is detected in a header 108 during the read-while-write process, the data 102 and headers 108 may be rewritten to the magnetic medium. However, the headers 108 may need to be modified prior to performing the rewrite to update the addressing and metadata contained therein. The data 102, on the other hand, may remain unchanged. Because the headers 108 are protected by a single dimension of ECC parity (i.e., are protected by row ECC parity 104), only the row ECC parity 104 needs to be recomputed for the updated headers 108, as opposed to needing to recompute both row and column ECC parity 104, 106 (which is computationally intensive and can significantly reduce format efficiency). Furthermore, only the row ECC parity 104 for those rows whose headers 108 have changed need to be recomputed. Thus, protecting the headers 108 with a single dimension of ECC protection may provide adequate protection for the headers 108 while still preserving format efficiency.

It should be recognized that, in some embodiments, each row of the SDS array 102 may be made up of multiple interleaved data words. As an example, each row in the SDS array 102 may include four interleaved data words of 234 bytes each, making each row 936 bytes long. The data words may be interleaved on a byte-by-byte or other suitable basis. Similarly, the row ECC parity 104 and headers 108 associated with the rows may also be interleaved. For example, four interleaved headers 108 (one for each data word in the row) of three bytes each may be associated with each row in the array 102, making each row of headers 108 twelve bytes long. The headers 108 may be interleaved on a byte-by-byte or other suitable basis. Similarly, four interleaved row ECC parity codes 104 (one for each data word in the row) of twelve bytes each may be associated with each row in the array 102, making each row of ECC parity codes 104 forty-eight bytes long. The row ECC parity codes 104 may be interleaved on a byte-by-byte or other suitable basis. Using the numbers provided above, each row (including the headers 108, the SDS data 102, and the row ECC parity 104) would be 996 bytes long. These numbers are provided only by way of example and are not intended to be limiting. Also, interleaving is not necessarily used in all embodiments.

The instant inventors have found that using the numbers provided above (i.e., 234 bytes for each data word 102, three bytes for each header 108, and twelve bytes for row ECC parity 104), up to five bytes of the combined header 108 and data word 102 may be corrected using the twelve byte row ECC parity 104. Furthermore, all three bytes in the header 108 may be corrected using the twelve byte row ECC parity 104. If the data is interleaved, up to twenty consecutive interleaved bytes may be corrected assuming a margin of one byte of error correction capability is used to reduce the miscorrection probability. In short, integrating the header and data protection is significantly more efficient than independently protecting the header 108 and data 102 with ECC parity.

Figure 6A:
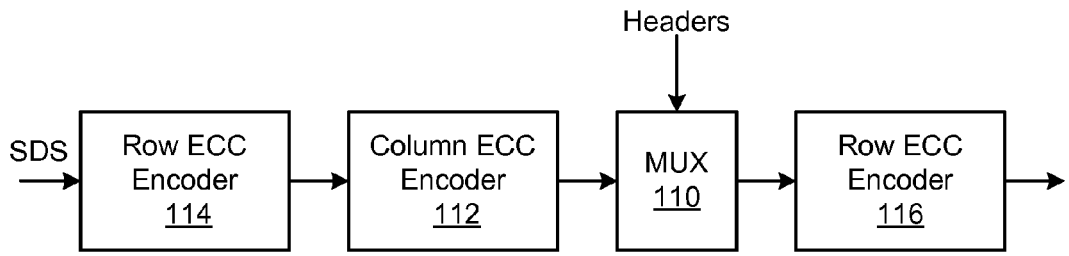
FIG. 6A is a high-level block diagram showing an alternative embodiment of a method for generating ECC parity to protect both data and headers.
Figure 6B:
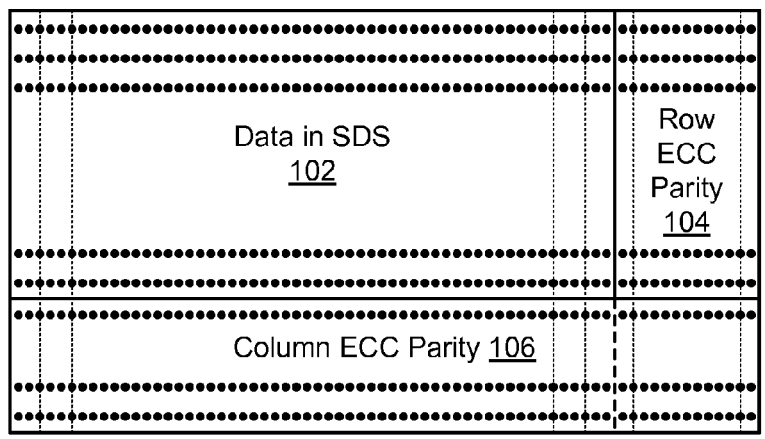
FIGS. 6B and 6C show how ECC parity information is generated and appended to a data array using the method of FIG. 6A.
Figure 6C:
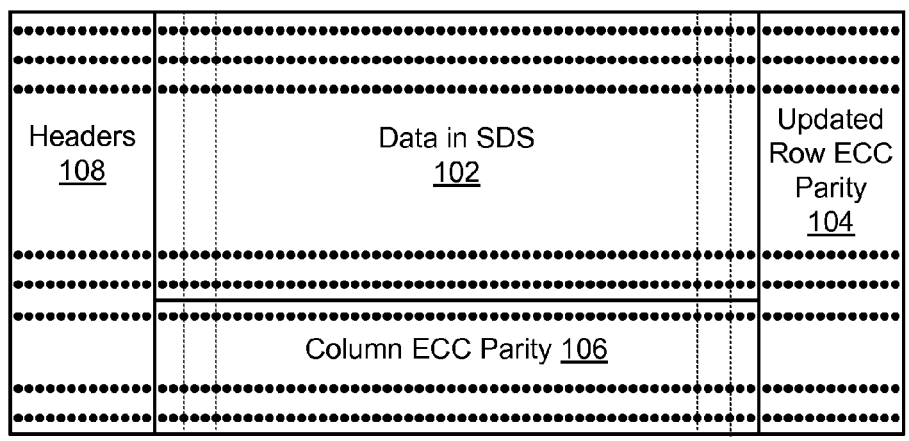

Referring to FIG. 6A, one alternative embodiment of a method for generating ECC parity to protect both the SDS data 102 and headers 108 is illustrated. FIGS. 6B and 6C show how the ECC parity information is generated and appended to a data array 102 using the method of FIG. 6A. In this embodiment, upon receiving an SDS array 102, a row ECC encoder 114 generates row ECC parity 104 for the SDS data 102 and appends it to the array 102, as shown in FIG. 6B. A column ECC encoder 112 then generates ECC parity 106 for each column in the SDS array 102 (including the row ECC parity 104) and appends the ECC parity 106 to the array 102, as further shown in FIG. 6B. The multiplexer 110 may then append headers 108 to the rows, as shown in FIG. 6C. The extended array 102 (i.e., the SDS data 102, headers 108, and column ECC parity 106) may then be passed into the same or a different row ECC encoder 116 to update the row ECC parity 104 for each row, which now include the headers 108. In this way, two dimensions of ECC protection may be provided for the SDS data 102 and a single dimension of ECC protection may be provided for the headers 108. One potential advantage of using this technique is that it may be easier to use conventional ECC encoding hardware, such as that used to implement the method of FIG. 1A.

Figure 7A:
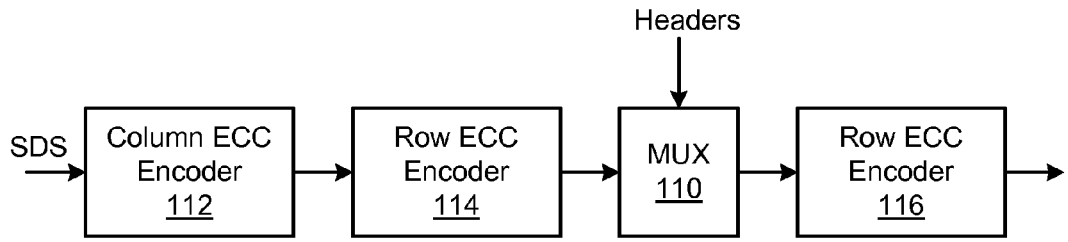
FIG. 7A is a high-level block diagram showing yet another embodiment of a method for generating ECC parity to protect both data and headers.
Figure 7B:
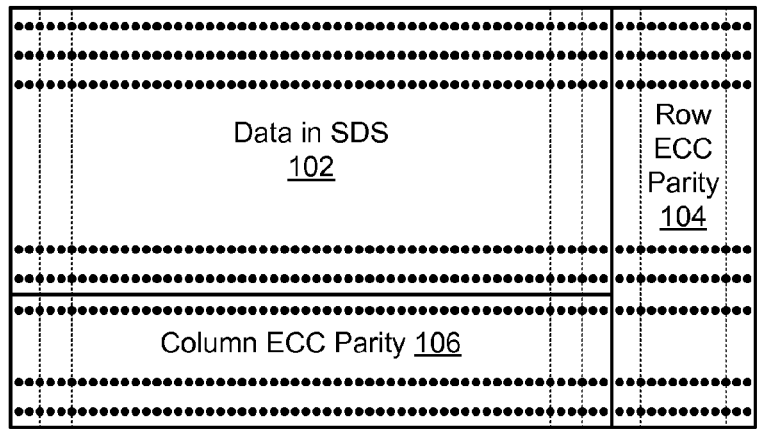
FIGS. 7B and 7C show how ECC parity information is generated and appended to a data array using the method of FIG. 7A.
Figure 7C:
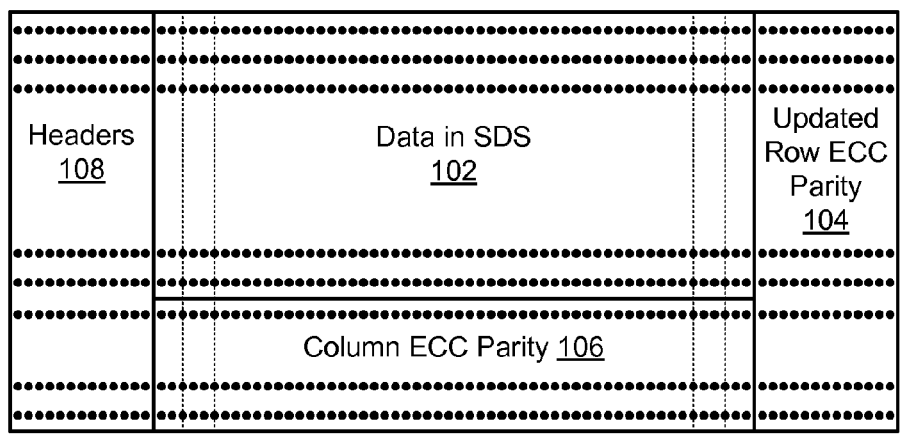

Referring to FIG. 7A, yet another embodiment of a method for generating ECC parity to protect both the SDS data 102 and headers 108 is illustrated. FIGS. 7B and 7C show how the ECC parity information is generated and appended to an SDS array 102 using the method of FIG. 7A. In this embodiment, upon receiving a sub data set 102, a column ECC encoder 112 generates ECC parity 106 for each column in the SDS array 102 and appends the ECC parity 106 to the array 102, as shown in FIG. 7B. A row ECC encoder 114 then generates row ECC parity 104 for the SDS data 102 (and the column ECC parity 106) and appends the row ECC parity 104 to the array 102, as further shown in FIG. 7B. The multiplexer 110 then appends headers 108 to the rows as shown in FIG. 7C. The extended array 102 (i.e., the SDS data 102, headers 108, and column ECC parity 106) may then be passed to either the same or a different row ECC encoder 116 to update the row ECC parity 104 for each row, which now include the headers 108. In this way, two dimensions of ECC protection may be provided for the SDS data 102 and a single dimension of ECC protection may be provided for the headers 108.

Figure 8:
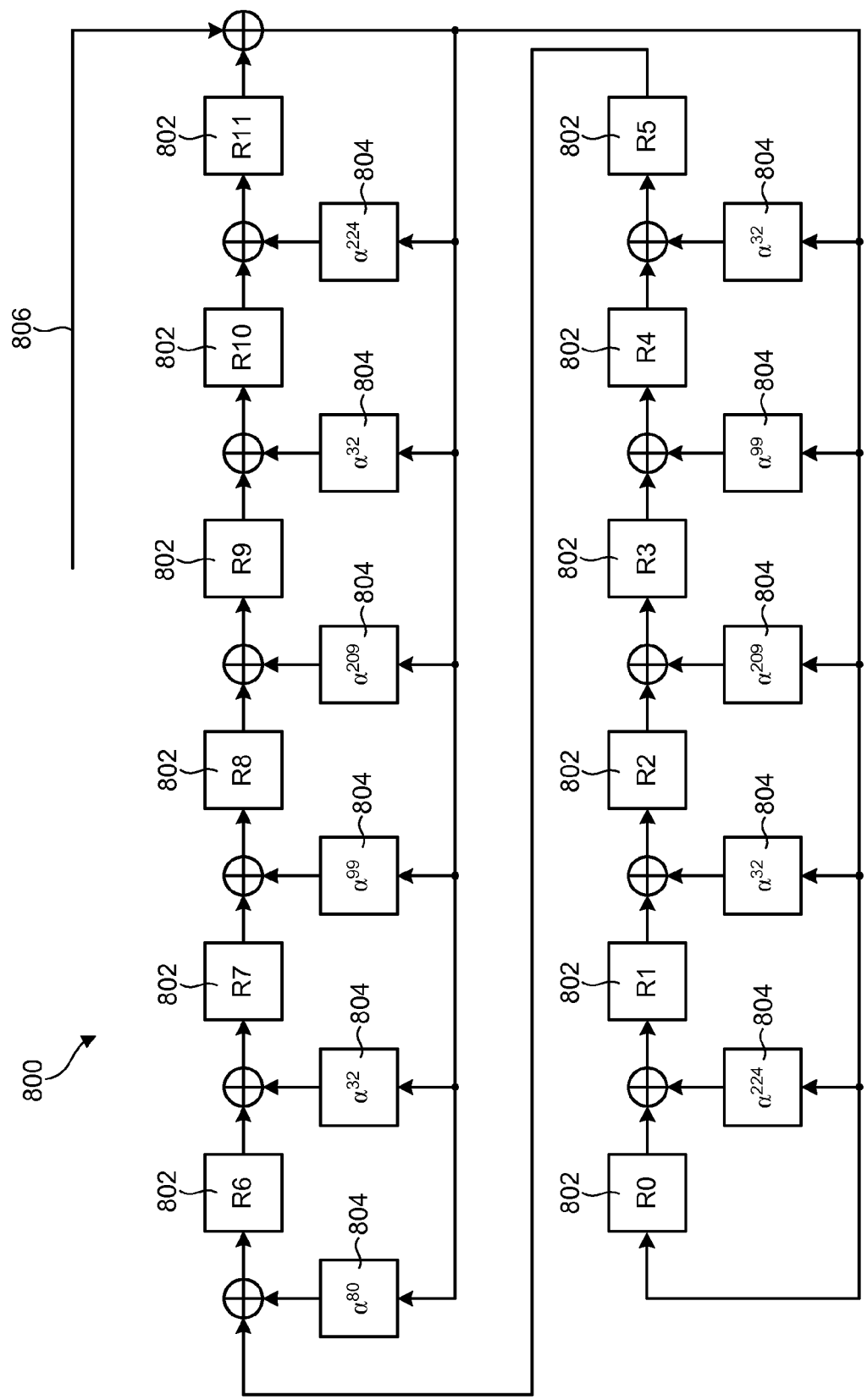
FIG. 8 is a high-level block diagram showing one embodiment of an encoder circuit for calculating the row ECC parity for the combined SDS data and headers.

Referring to FIG. 8, one embodiment of an encoder circuit 800 for calculating the row ECC parity 104 for the combined SDS data 102 and headers 108 is illustrated. More specifically, the encoder circuit 800 is configured to calculate Reed-Solomon ECC parity 104 for the combined SDS data 102 and headers 108. As shown, the encoder circuit 800 includes a number of registers 802, in this example twelve registers 802 (labeled R0, R1, . . . , R11), each of which stores a symbol, such as a byte of data. The registers 802 are connected sequentially with feedback. The encoder circuit 800 further includes eleven multipliers 804 (each expressed as a raised to some power n) interacting with the registers 802 in the illustrated manner. Each of the multipliers 804 multiplies an input value by some fixed value $\alpha^n$. The product is added to a register's value and stored in the next register.

In the illustrated example, assume that the circuit 800 is configured to generate a twelve byte Reed-Solomon parity 104 for a 234 byte data word and a three byte header 108. To generate the Reed-Solomon parity 104, the values in the registers 802 are initially set to zero. The bytes of the data word and the header are then fed sequentially into the encoder circuit 800, byte-by-byte, by way of the input line 806. Once all data bytes are fed into the input line 806, the registers 802 will store the twelve-byte Reed-Solomon parity 104. To update a Reed-Solomon parity 104, such as when a row in an SDS array 102 is updated with a header 108 (as discussed in association with FIGS. 6A and 7A), the previous Reed-Solomon parity 104 is simply loaded into the registers 802. The bytes of the newly added header 108 may then be fed sequentially, byte-by-byte, into the encoder circuit 800 by way of the input line 806. Once all bytes of the header 108 or part of it (e.g., 3 bytes out of a 12-byte header) have been fed into the input line 806, the registers 802 will store the updated twelve-byte Reed-Solomon parity 104. A similar encoding mechanism may be used to update the Reed-Solomon parity associated with the other interleaves in a row of an encoded SDS.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for integrating data and header protection in tape drives, the method comprising:
providing a data array organized into rows and columns;
calculating column ECC parity for the columns;
extending the columns to include the column ECC parity;
adding a header to each row of the column-extended data array;
calculating row ECC parity for the rows and headers combined; and
extending the rows to include the row ECC parity.

2. The method of claim 1, wherein the data array is a sub data set (SDS) organized into an array format.

3. The method of claim 1, wherein the column ECC parity comprises Reed-Solomon parity.

4. The method of claim 1, wherein the row ECC parity comprises Reed-Solomon parity.

5. The method of claim 1, wherein the rows comprise L interleaved data words.

6. The method of claim 5, wherein L is equal to one of 2 and 4.

7. The method of claim 1, wherein extending the rows to include the row ECC parity comprises updating row ECC parity that was calculated for the rows prior to adding the headers.

8. A method for integrating data and header protection in tape drives, the method comprising:
   receiving an array of data organized into rows and columns;
   extending the array to include a header for each row of data in the array;
   providing two dimensions of error correction code (ECC) protection for the data in the array; and
   providing a single dimension of ECC protection for the headers in the array.

9. The method of claim 8, wherein the array of data is a sub data set (SDS) organized into an array format.

10. The method of claim 8, wherein providing two dimensions of error correction code (ECC) protection for the data comprises providing ECC parity for both the rows and columns of data.

11. The method of claim 10, wherein the ECC parity comprises Reed-Solomon parity.

12. The method of claim 8, wherein providing a single dimension of ECC protection for the headers in the array comprises providing ECC parity for one of rows and columns of the headers.

13. The method of claim 12, wherein the ECC parity comprises Reed-Solomon parity.

* * * * *